United States Patent [19]
Cox

[11] 3,730,557
[45] May 1, 1973

[54] UNIVERSAL JOINT TRAILER HITCH WITH COUPLING PIN SOCKET ALIGNING AND BEARING MEANS

[76] Inventor: Rodney S. Cox, 919 Harvey Dr. P.O. Box 1026, Marion, Ohio 43302

[22] Filed: Sept. 7, 1971

[21] Appl. No.: 178,036

[52] U.S. Cl..................................280/504, 280/492
[51] Int. Cl. ..............................................B60d 1/00
[58] Field of Search......................280/504, 477, 492, 280/514, 515

[56] References Cited

UNITED STATES PATENTS

| | | | |
|---|---|---|---|
| 3,124,372 | 3/1964 | Poole | 280/477 |
| 2,048,310 | 7/1936 | Wohldorf | 280/477 |
| 2,444,575 | 7/1948 | McElhinney | 280/504 |
| 3,434,739 | 3/1969 | Schoonover | 280/492 |
| 2,871,030 | 1/1959 | Hollis | 280/492 |
| 3,103,798 | 9/1963 | Piatti | 64/17 |
| 2,133,065 | 10/1938 | Weber | 280/504 |
| 2,478,736 | 8/1949 | Balzer | 280/477 |

*Primary Examiner*—Leo Friaglia
*Assistant Examiner*—David M. Mitchell
*Attorney*—William V. Miller et al.

[57] ABSTRACT

A trailer hitch for connecting a draft member on a towing vehicle to a draft member on a trailer to be towed. The hitch includes positive connections between the two draft members which provide pivoting about three axes or universal movement. The hitch also provides a removable coupling pin between the two draft members with pin-socket aligning means which positively align the sockets for receiving the pin and thereafter serve as bearing means to prevent excessive shear forces on the pin.

5 Claims, 7 Drawing Figures

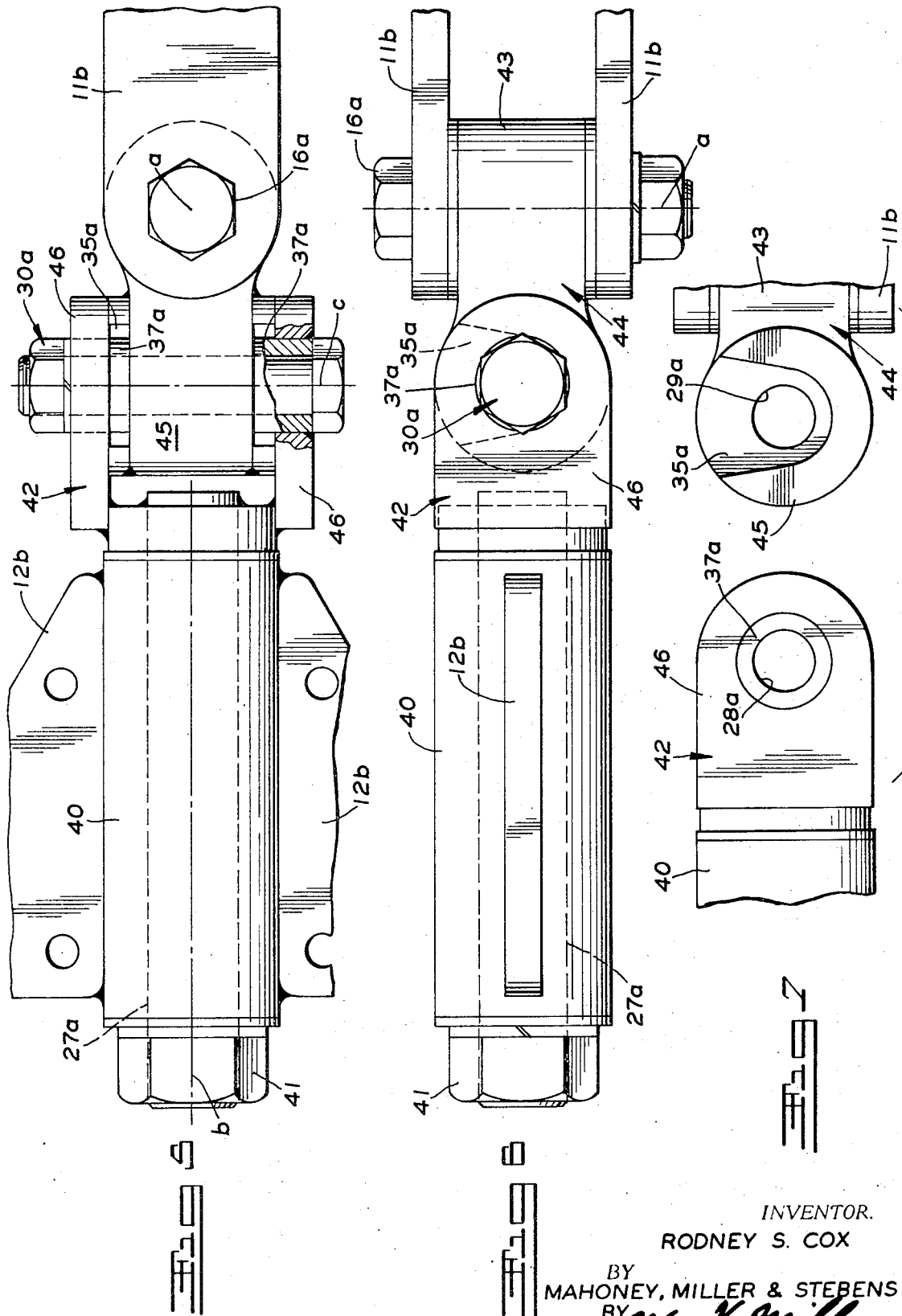

UNIVERSAL JOINT TRAILER HITCH WITH COUPLING PIN SOCKET ALIGNING AND BEARING MEANS

The structure of this invention is adapted to replace the usual ball-type hitch. With the ball-type hitch, there is danger of the socket or housing working loose from the ball and the trailer becoming unhitched from the vehicle. The arrangement provided by this invention is a positive hitch with no danger of it accidentally coming apart. However, it still has various parts connected together in such a manner as to provide for universal pivotal movement.

The best mode contemplated in carrying out this invention is illustrated in the accompanying drawings in which:

FIG. 4 is a side elevational view showing the draft members disconnected.

FIG. 5 is a plan view, partly cut away, illustrating another form of this invention.

FIG. 6 is a side elevational view of the structure of FIG. 5.

FIG. 7 is a side elevational view, showing the draft members of FIGS. 5 and 6 disconnected.

With specific reference to the form of the invention shown in FIGS. 1 to 4, inclusive, there is illustrated the two draft members 11 and 12, the member 11 being the one mounted on the towing vehicle and the member 12 being the one connected to the trailer. However, these could be reversed. The member 11 preferably is a bracket welded or otherwise rigidly secured to the rear end of the towing vehicle and the member 12 is the tongue extending forwardly from the vehicle to be towed. Coupling units adapted to be coupled together to form the complete hitch are carried by the respective members 11 and 12.

Figure 1:
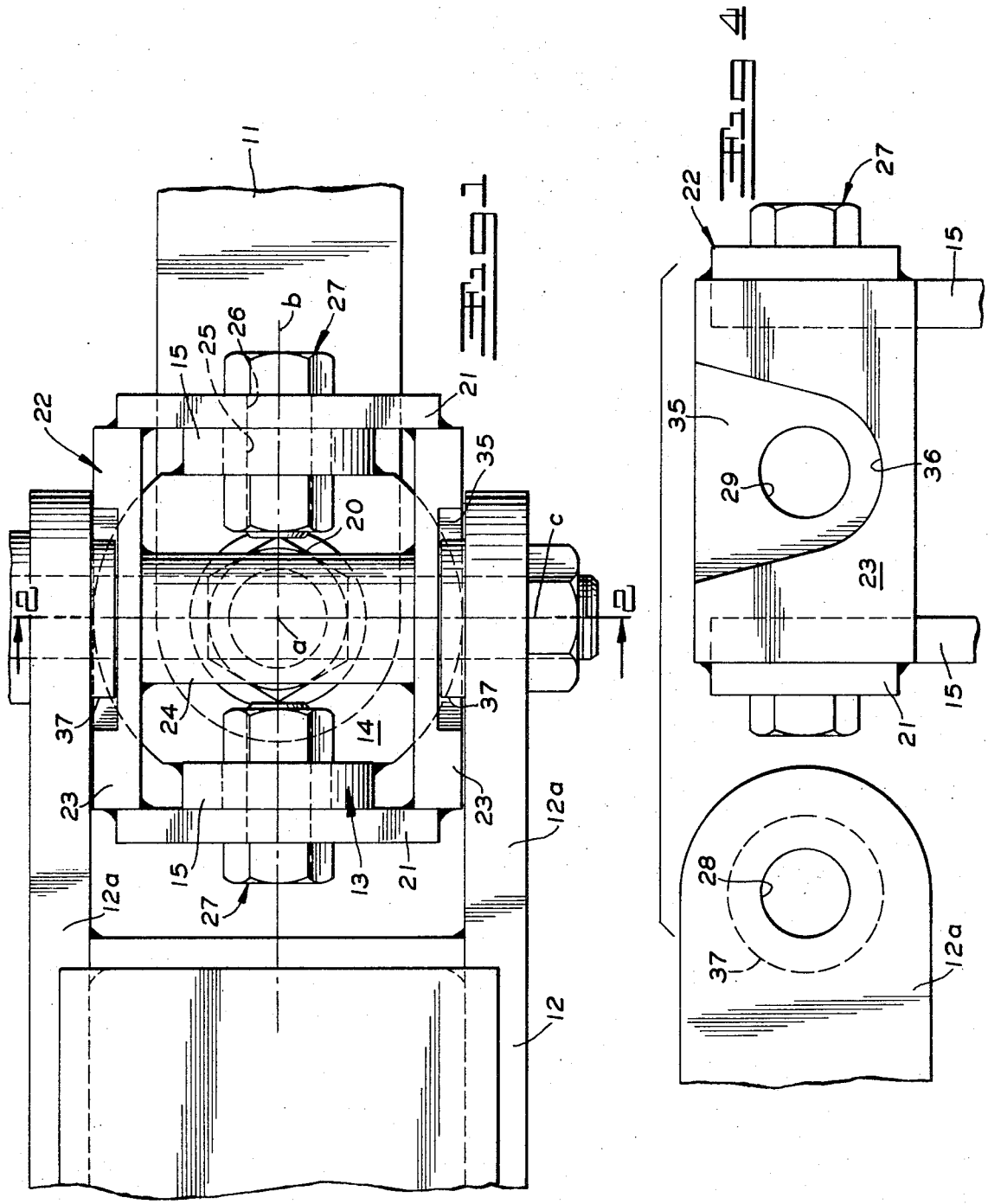
FIG. 1 is a plan view illustrating one form of this invention.
Figure 2:
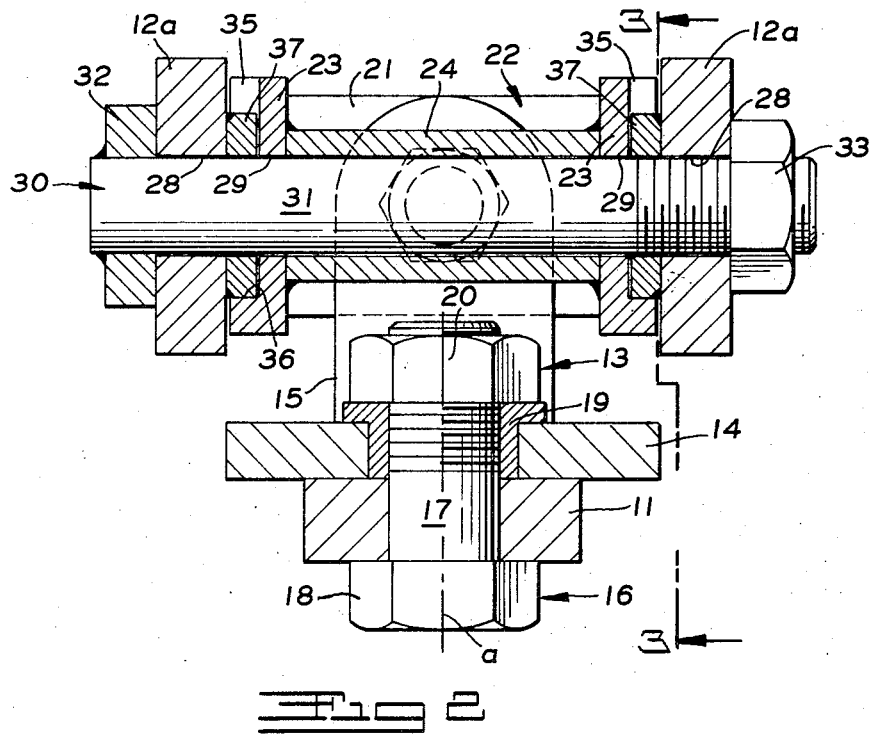
FIG. 2 is a vertical sectional view taken along line 2—2 of FIG. 1.
Figure 3:
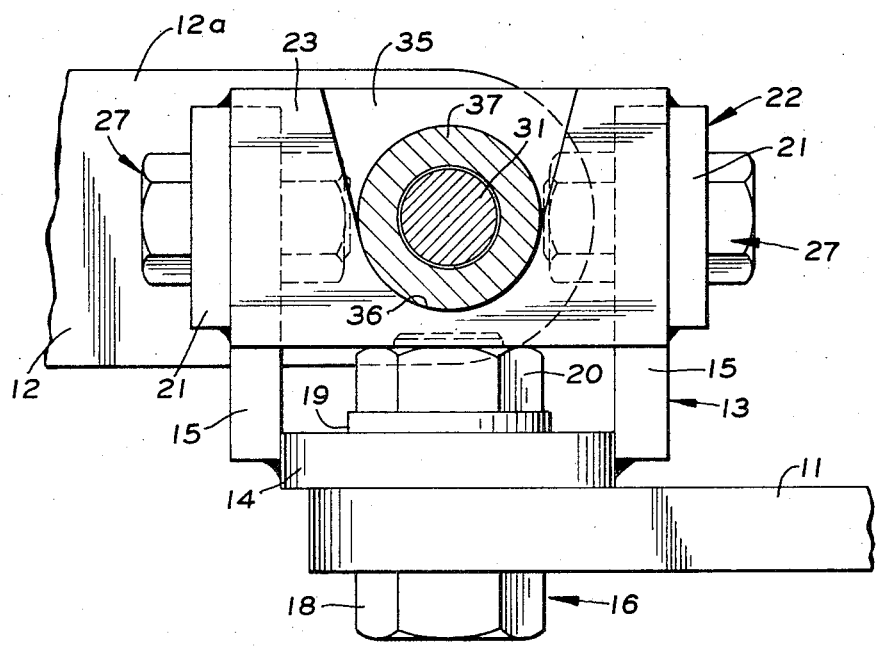
FIG. 3 is a sectional view taken along line 3—3 of FIG. 2.

In this form of the invention, the majority of the parts of the hitch are carried by the bracket or draft member 11. These parts include an upstanding yoke member 13 which embodies a disc member 14 and spaced parallel upstanding arms 15 carried thereby. The disc 14 will rest on the member 11 and is rotatably secured thereto by means of a nut and bolt unit 16 for pivotal or rotative movement about a vertical axis. The unit 16 includes the bolt 17 which has a head 18 on its lower end that is drawn up into engagement with the lower side of the member 11, passing through aligning openings in that member and the disc 14. The opening in the disc 14 is enlarged to receive a flanged bushing 19 of slightly greater axial extent than the thickness of disc 14. A nut 20 threaded on the upper end of the bolt 17 will bear against the flange on the upper end of the bushing and force it into contact with member 11, without clamping disc 14 therebetween, but permitting it to freely rotate. Thus, yoke member 13 is pivoted to member 11 for movement about a normally vertical axis $a$. (FIG. 1).

The arms 15 of the yoke 13 extend upwardly within the parallel side members 21 of a substantially square frame 22. This frame also includes the two side frame members 23 at right angles to the members 21 and rigidly connected thereto and braced by the transverse spacer sleeve 24. The opposed side members of the square frame 22 are in the form of upright plates 23, as indicated. The members 15 extend within and in contact with the members 21. These members 15 are provided with openings 25 which are aligned with openings 26 in the side members 21 and which receive pivot bolts and nut units 27. Thus, the yoke 13 is pivotally connected to the frame 22 for pivoting movement about a normally longitudinal axis $b$ (FIG. 1). The parts so far described are normally mounted and retained on the draft member 11.

The draft member 12 is bifurcated at its outer end to provide the bifurcations or extensions 12a which are disposed in parallel relationship and which are adapted to straddle the frame 22 when members 11 and 12 are connected. These members 12a are provided adjacent their outer ends with transversely aligned coupling pin-receiving openings 28. The frame side members 23 are also provided with opposed coupling pin-receiving openings 29 which align with sleeve 24. The draft member 12 will be disposed in straddling relationship to the frame 22 and the openings 28 and 29 of the respective members will be aligned to receive a coupling pivot pin unit 30. This unit will consist of the stud 31 of the pin, which extends through sleeve 24 and projects from the ends thereof and has a fixed head 32 on one end and a nut 33 threaded on the other end. The members 32 and 33 will be in engagement with the outer surface of the respective members 12a.

An important feature of this invention is the provision of a cradle and guide arrangement between the respective members 12a and 23 for quickly aligning the openings 28 and 29 thereof to receive the bolt unit 30 and thereafter providing a bearing surface to relieve the coupling pin from shearing stresses resulting from the downwardly bearing load mainly transmitted thereto through the draft member 12. This arrangement includes a cradle which is formed by a recess 35 in the outer surface of each of the opposed side frame members 23. This recess is formed in the flat surface of the member 23 in surrounding relationship to the opening 29 and flares outwardly to the upper edge of the member 23. Thus, there is provided an upwardly opening flared recess which provides a curved cradling surface 36 at its lower side which is concentric with the opening 29. For cooperation with the cradling recess 35, an inwardly projecting boss 37 is formed on the inner surface of each member 12a in concentric surrounding relationship to the opening 28 therein. The boss 37 will project inwardly a distance slightly less than the depth of the recess 35, the curvature and size of the boss being such that it will snugly fit into and rest on the curved bottom 36 of the cradle. In other words, these curved surfaces will be complemental so that the boss 37 will rest on the bottom 36 of the cradle and will be free to rock therein. At this time, the openings 28 and 29 will be in exact alignment for receiving the stud 31. Thus, the draft 12 will be connected to the frame 22 for movement about a normally transverse axis $c$ (FIG. 1).

It will be apparent that to couple the members 11 and 12, it is merely necessary to cause the extensions 12a of the member 12 to be positioned above the frame 22 and then by downward movement of the member 12, cause the bosses 37 to enter the wide mouths of the cradles 35 and to be guided thereinto until the bosses rest on the bottom surfaces 36 of the cradles. Since the openings 28 and 29 are now accurately aligned, the stud 31 of the pin can be readily passed therethrough. With the nut 33 then applied, the coupling is completed. The engaging bearing surfaces 36 and 37 will prevent downward shearing forces, caused mainly by the weight of the towed vehicle transmitted through the member 12, from acting on the pin 31. To uncouple the members 11 and 12, it is merely necessary to remove the pin unit 30 and lift the bosses 37 out of the cradles 35.

If desired, the boss and cradle arrangement could be reversed. That is, the boss could be fixed to the member 23 and the cradle recess could be formed in the inner surface of the overlapping member 12a. Also, all of the bolt units could be formed like the unit 16 to limit the clamping action and to maintain the pivotal relationship of the connected members.

In the form of the invention illustrated in FIGS. 5 to 7, universal pivoting movement is provided as before along the pivotal axis $a$, $b$ and $c$. Also, a similar cradling relationship between the parts to be coupled is provided at 35a.

The bracket carried by the towing vehicle includes the vertically spaced arms 11b. The vehicle to be towed has the brackets 12b fixed thereto. These brackets carry a sleeve 40 rigidly fixed thereto which receives a longitudinally extending pivot bolt 27a that includes the removable nut 41 at its rear end. At its forward end, the bolt is rigidly secured to a yoke 42. Thus, the yoke 42 can rotate about the longitudinal normally horizontal axis $b$. This bolt unit may be similar to the unit 16, if desired.

The members 11b have located therebetween the cylindrical portion 43 of a coupling member 44. The portion 43 is pivoted to the arms 11b by means of a bolt unit 16a whereby the member 44 can swing about the normally vertical axis $a$.

The yoke 42 is adapted to be disposed in straddling relationship to a cylindrical portion 45 of the member 44. This portion 45 is turned at a right angle to the portion 43 and is provided with an opening 29a at a right angle to the axis of the bolt 16a. The sides or ends of the portion 45 are flat and are provided with the cradle recesses 35a formed exactly like the recesses 35 and in the same surrounding relationship to the respective ends of the opening 29a, it being understood that this opening extends completely through the portion 45. The yoke 42 is provided on the inner surfaces of its arms 46 with bosses 37a which surround openings 28a formed therein.

It will be apparent that the bifurcated member or yoke 42 will be slipped over the cylindrical portion 45 so that the bosses 37a drop into the upwardly opening cradles 35a. This will align the openings or sockets 28a and 29a of the respective members 42 and 44 for receiving the coupling pin unit 30a to provide for relative pivotal movement about the transverse axis $c$. Thus, the same cradle aligning structure for the coupling pin is provided and the bearing relationship is established to prevent downward force by the yoke 42 from being transmitted to the pin 30a.

As pointed out above, the cradling structure in both examples of the invention is formed between two overlapping members which have openings or sockets adapted to be brought into alignment. The cradling recess is indented in the face of one of such members and extends with its guide surfaces diverging to the edge of such member. The bushing or collar to be cradled is formed on the adjacent face of the other member around the pin-receiving opening or socket formed therein and is of such diameter that it will pass into the wide mouth of the cradling recess and will finally reach a cradled position at the inner end of the recess, at which time the coupling pin-receiving openings in the respective overlapping members will be in axial alignment.

It will be apparent from the above description that the hitch of this invention provides movement about any of three axes disposed at right angles to each other or any combination of such movements so that a universal pivot connection is provided between the two draft members. Furthermore, the cradling arrangement between the two parts carried by the respective draft members and normally to be connected and disconnected quickly and accurately, aligns the holes for receiving the removable coupling pin. Thereafter, the cradling arrangement serves as a bearing structure to prevent certain shearing forces from being transmitted to the coupling pin.

Having thus described this invention, what is claimed is:

1. A trailer hitch comprising coupling units on respective draft members to be coupled together and carried by the towing vehicle and the trailer to be towed, one of said units including a bifurcated coupling member having laterally-spaced, longitudinally-extending bifurcations and the other including a coupling member to be received between and overlapped by the bifurcations of said first coupling member to provide cooperating pairs of surfaces at the respective bifurcations in face-to-face relationship, one of the faces of each pair having a cradle recess indented therein and opening upwardly at the upper extent of said face to provide upwardly opening guide mouths and the other having a boss projecting therefrom so that when the bifurcated coupling and the other coupling are moved vertically relatively into cooperative relationship the bosses will be guided simultaneously downwardly into the upwardly opening guide mouths of the cradles to a seated bearing position on the bottom of the cradles, said first coupling member bifurcations and said second coupling member having pin-receiving sockets which will be aligned when the bosses are seated in the cradles, and a coupling pin extending through said aligned sockets.

2. A trailer hitch according to claim 1 in which each cradle recess has an inner curved bottom end portion concentric with the pin-receiving socket which it surrounds and diverges outwardly to the upper edge of the coupling member in which it is provided so that it provides a wide outwardly-opening guide mouth, said boss being circular and concentric with the socket formed in the coupling member which carries it and being of smaller diameter than the width of the mouth and complemental to the inner curved bottom end of said cradle recess.

3. A trailer hitch according to claim 2 in which the boss projects from the face in which it is formed a distance less than the extent of the said cradle recess indentation into the face in which it is formed.

4. A trailer hitch according to claim 3 in which the bifurcated coupling member straddling the other coupling member limits relative lateral movement, said coupling pin having clamping portions on its ends in engagement with the outer surfaces of the said bifurcations to prevent spreading thereof and resulting axial displacement of the bosses from the cradles.

5. A trailer hitch according to claim 4 in which the coupling pin provides one pivot axis between the draft members and the coupling units carried by the draft members include two additional pivot structures providing pivot axis at right angles to each other and to said first pivot axis to provide for universal pivoting movement between the connected draft members.

* * * * *